(12) United States Patent
Doerksen

(10) Patent No.: US 9,699,123 B2
(45) Date of Patent: Jul. 4, 2017

(54) METHODS, SYSTEMS, AND NON-TRANSITORY MACHINE-READABLE MEDIUM FOR INCORPORATING A SERIES OF IMAGES RESIDENT ON A USER DEVICE INTO AN EXISTING WEB BROWSER SESSION

(71) Applicant: Ditto Technologies, Inc., San Mateo, CA (US)

(72) Inventor: Katherine Endress Doerksen, Mountain View, CA (US)

(73) Assignee: DITTO TECHNOLOGIES, INC., San Mateo, CA (US)

( * ) Notice: Subject to any disclaimer, the term of this patent is extended or adjusted under 35 U.S.C. 154(b) by 296 days.

(21) Appl. No.: 14/242,772

(22) Filed: Apr. 1, 2014

(65) Prior Publication Data

US 2015/0281351 A1  Oct. 1, 2015

(51) Int. Cl.
*H04L 12/58* (2006.01)
*G06F 17/30* (2006.01)
*G06F 3/01* (2006.01)
*H04L 29/08* (2006.01)

(52) U.S. Cl.
CPC .......... *H04L 51/10* (2013.01); *G06F 17/3089* (2013.01); *H04L 51/046* (2013.01); *H04L 51/08* (2013.01); *H04L 67/2857* (2013.01); *G06F 3/011* (2013.01); *H04L 67/14* (2013.01)

(58) Field of Classification Search
CPC ..... G06T 17/00; G06T 13/40; G06K 9/00275; G06Q 30/0643
See application file for complete search history.

(56) References Cited

U.S. PATENT DOCUMENTS

| | | |
|---|---|---|
| 5,060,171 A | 10/1991 | Steir et al. |
| 5,576,778 A | 11/1996 | Fujie et al. |
| 5,592,248 A | 1/1997 | Norton et al. |
| 5,680,528 A | 10/1997 | Korszun |
| 5,850,222 A | 12/1998 | Cone |
| 5,930,769 A | 7/1999 | Rose |
| 6,095,650 A | 8/2000 | Gao et al. |
| 6,142,628 A | 11/2000 | Saigo |

(Continued)

FOREIGN PATENT DOCUMENTS

| | | |
|---|---|---|
| DE | 10007705 A1 | 9/2001 |
| DE | 10216824 A1 | 11/2003 |

(Continued)

OTHER PUBLICATIONS

Miller, A., et al., "FashionMe: The Future of Fashion Shopping over the Internet," University of Stuttgart, Sep. 2000; 6 pages.

(Continued)

*Primary Examiner* — Barbara Burgess
(74) *Attorney, Agent, or Firm* — Ascenda Law Group, PC

(57) ABSTRACT

Users desiring to associate a media object with an existing web browser session are provided with an out-of-band communication path by which to effect the association. When the media object is received at a web server involved in the session, the server creates a model of the item depicted in the media object and associates the model with the session. A projection of the resulting model is then made available for viewing (and, in some instances, manipulation) by the user during the web browser session.

18 Claims, 3 Drawing Sheets

(56) References Cited

U.S. PATENT DOCUMENTS

| | | | |
|---|---|---|---|
| 6,144,388 A | 11/2000 | Bornstein | |
| 6,231,188 B1 | 5/2001 | Gao et al. | |
| 6,307,568 B1 | 10/2001 | Rom | |
| 6,404,426 B1 | 6/2002 | Weaver | |
| 6,508,553 B2 | 1/2003 | Gao et al. | |
| 6,533,418 B1 | 3/2003 | Izumitani et al. | |
| 6,546,309 B1 | 4/2003 | Gazzuolo | |
| 6,583,792 B1 | 6/2003 | Agnew | |
| 6,634,754 B2 | 10/2003 | Fukuma et al. | |
| 6,664,956 B1 | 12/2003 | Erdem | |
| 6,692,127 B2 | 2/2004 | Abitbol et al. | |
| 6,731,287 B1 | 5/2004 | Erdem | |
| 6,901,379 B1 | 5/2005 | Balter et al. | |
| 6,903,756 B1 | 6/2005 | Giannini | |
| 6,922,494 B1 | 7/2005 | Fay | |
| 6,937,755 B2 | 8/2005 | Orpaz et al. | |
| 7,010,146 B2 | 3/2006 | Fukuma et al. | |
| 7,062,454 B1 | 6/2006 | Giannini et al. | |
| 7,062,722 B1 | 6/2006 | Carlin et al. | |
| 7,079,158 B2 | 7/2006 | Lambertsen | |
| 7,083,278 B2 | 8/2006 | Broderick et al. | |
| 7,149,665 B2 | 12/2006 | Feld et al. | |
| 7,154,529 B2 | 12/2006 | Hoke et al. | |
| 7,167,771 B2 | 1/2007 | Ito | |
| 7,194,327 B2 | 3/2007 | Lam | |
| 7,222,091 B2 | 5/2007 | Yoshida | |
| 7,287,853 B2 | 10/2007 | Toshima et al. | |
| 7,346,543 B1 | 3/2008 | Edmark | |
| 7,441,895 B2 | 10/2008 | Akiyama et al. | |
| 7,479,956 B2 | 1/2009 | Shaw-Weeks | |
| 7,487,116 B2 | 2/2009 | Paolini | |
| 7,634,103 B2 | 12/2009 | Rubinstenn et al. | |
| 7,665,843 B2 | 2/2010 | Xie | |
| 7,712,035 B2 | 5/2010 | Giannini | |
| 7,764,828 B2 | 7/2010 | Sasaki et al. | |
| 7,773,091 B2 | 8/2010 | Giron et al. | |
| RE42,205 E | 3/2011 | Jung et al. | |
| 7,917,397 B1 | 3/2011 | Giannini et al. | |
| 7,950,800 B2 | 5/2011 | Nauche et al. | |
| 7,982,750 B2 | 7/2011 | Xie | |
| 8,078,498 B2 | 12/2011 | Edmark | |
| 8,107,672 B2 | 1/2012 | Goto | |
| 8,220,922 B2 | 7/2012 | Chauveau et al. | |
| 8,275,590 B2 | 9/2012 | Szymczyk et al. | |
| 8,321,301 B2 | 11/2012 | Manea et al. | |
| 8,359,247 B2 | 1/2013 | Vock | |
| 8,380,586 B2 | 2/2013 | Paolini | |
| 2001/0023413 A1 | 9/2001 | Fukuma et al. | |
| 2001/0037191 A1 | 11/2001 | Furuta et al. | |
| 2003/0065255 A1 | 4/2003 | Giacchetti et al. | |
| 2003/0110099 A1 | 6/2003 | Trajkovic et al. | |
| 2003/0187747 A1 | 10/2003 | Fukasawa et al. | |
| 2004/0004633 A1* | 1/2004 | Perry | G06Q 30/0603 715/728 |
| 2004/0015412 A1 | 1/2004 | Shinbo | |
| 2004/0030617 A1 | 2/2004 | Shinbo | |
| 2004/0054616 A1 | 3/2004 | Shinbo | |
| 2004/0227752 A1 | 11/2004 | McCartha et al. | |
| 2005/0131776 A1 | 6/2005 | Perotti et al. | |
| 2005/0162419 A1 | 7/2005 | Kim et al. | |
| 2006/0149638 A1 | 7/2006 | Allen | |
| 2006/0271448 A1 | 11/2006 | Inoue et al. | |
| 2007/0113181 A1 | 5/2007 | Blattner et al. | |
| 2007/0244722 A1 | 10/2007 | Vortz et al. | |
| 2008/0074440 A1 | 3/2008 | Xie | |
| 2008/0201641 A1 | 8/2008 | Xie | |
| 2008/0249897 A1 | 10/2008 | Oh et al. | |
| 2009/0128579 A1 | 5/2009 | Xie | |
| 2009/0135176 A1 | 5/2009 | Snoddy et al. | |
| 2009/0202114 A1 | 8/2009 | Morin et al. | |
| 2010/0030578 A1 | 2/2010 | Siddique et al. | |
| 2010/0050082 A1* | 2/2010 | Katz | H04N 5/272 715/719 |
| 2010/0149177 A1 | 6/2010 | Miller | |
| 2010/0198381 A1 | 8/2010 | Feldman | |
| 2010/0220285 A1 | 9/2010 | Simmonds | |
| 2010/0235152 A1 | 9/2010 | Kimura et al. | |
| 2010/0283844 A1 | 11/2010 | Sayag | |
| 2010/0306082 A1 | 12/2010 | Wolper et al. | |
| 2011/0071804 A1 | 3/2011 | Xie | |
| 2011/0166834 A1 | 7/2011 | Clara | |
| 2012/0022978 A1 | 1/2012 | Manea et al. | |
| 2012/0044335 A1 | 2/2012 | Goto | |
| 2012/0062555 A1 | 3/2012 | O'Connor et al. | |
| 2012/0079377 A1 | 3/2012 | Goossens | |
| 2012/0127199 A1 | 5/2012 | Aarabi | |
| 2012/0287122 A1* | 11/2012 | Nadar | G06T 17/00 345/419 |
| 2013/0006814 A1 | 1/2013 | Inoue et al. | |
| 2013/0215116 A1* | 8/2013 | Siddique | G06Q 30/0643 345/420 |
| 2013/0322685 A1* | 12/2013 | Li | G06K 9/00 382/103 |
| 2014/0149264 A1* | 5/2014 | Satyanarayana | G06Q 30/0643 705/27.2 |
| 2014/0225888 A1* | 8/2014 | Bell | G06T 17/00 345/419 |

FOREIGN PATENT DOCUMENTS

| | | |
|---|---|---|
| EP | 1240623 B1 | 7/2006 |
| EP | 1968016 A1 | 9/2008 |
| EP | 2251734 A1 | 11/2010 |
| JP | 64076362 A | 3/1989 |
| JP | 06118349 A | 4/1994 |
| JP | 06139318 A | 5/1994 |
| JP | 06290239 A | 10/1994 |
| JP | 11007466 A | 1/1999 |
| JP | 2000-123053 A | 4/2000 |
| JP | 2001350982 A | 12/2001 |
| JP | 2002063229 A | 2/2002 |
| JP | 2002083156 A | 3/2002 |
| JP | 2002109192 A | 4/2002 |
| KR | 100386962 B1 | 6/2003 |
| KR | 100417923 B1 | 2/2004 |
| WO | 98/21695 A1 | 5/1998 |
| WO | 99/40526 A1 | 8/1999 |
| WO | 2009065960 A1 | 5/2009 |
| WO | 2009065962 A1 | 5/2009 |
| WO | 2009065963 A1 | 5/2009 |
| WO | 2009065965 A1 | 5/2009 |
| WO | 2009065967 A1 | 5/2009 |
| WO | 2009065968 A1 | 5/2009 |
| WO | 2009112871 A1 | 9/2009 |
| WO | 2012054983 A1 | 5/2012 |
| WO | 2012072844 A1 | 6/2012 |
| WO | 2012123346 A2 | 9/2012 |

OTHER PUBLICATIONS

Defendant Ditto Technologies, Inc.'s Motion to Dismiss and Memorandum in Support, *1-800 Contacts, Inc. d/b/a glasses.com* v. *Ditto Technologies, Inc.*, Case No. 2:13-cv-00145-DN-DBP, United States District Court for the District of Utah, Northern Division, filed Apr. 29, 2013; 27 pages.

Opposition to Defendant's Motion to Dismiss, *1-800 Contacts, Inc. d/b/a glasses.com* v. *Ditto Technologies, Inc.*, Case No. 2:13-cv-00145-DN-DBP, United States District Court for the District of Utah, Central Division, filed Apr. 29, 2013; 27 pages.

Court Docket History for *1-800 Contacts, Inc. d/b/a glasses.com* v. *Ditto Technologies, Inc.*, Case No. 2:13-cv-00145-DN-DBP. United States District Court for the District of Utah, Central Division, last downloaded May 6, 2014; 5 pages.

* cited by examiner

300

```
┌─────────────────────────────────────┐
│ Establish session between computer  │
│ system 130 and server 110.          │
│ 305                                 │
└─────────────────────────────────────┘
                  │
                  ▼
┌─────────────────────────────────────┐
│ Request email address for media     │
│ object.                             │
│ 310                                 │
└─────────────────────────────────────┘
                  │
                  ▼
┌─────────────────────────────────────┐
│ Provide email address to which to   │
│ send media object.                  │
│ 315                                 │
└─────────────────────────────────────┘
                  │
                  ▼
┌─────────────────────────────────────┐
│ User captures media object using    │
│ second device and sends the media   │
│ object to the server at the         │
│ specified email address.            │
│ 320                                 │
└─────────────────────────────────────┘
                  │
                  ▼
┌─────────────────────────────────────┐
│ Receive email; remove attached      │
│ media object and create 3D model    │
│ from the media object.              │
│ 325                                 │
└─────────────────────────────────────┘
                  │
                  ▼
┌─────────────────────────────────────┐
│ Associate 3D model with current     │
│ session.                            │
│ 330                                 │
└─────────────────────────────────────┘
                  │
                  ▼
┌─────────────────────────────────────┐
│ Provide 3D model to the session     │
│ between computer system 130 and     │
│ server 100.                         │
│ 335                                 │
└─────────────────────────────────────┘
                  │
                  ▼
┌─────────────────────────────────────┐
│ Use 3D model during virtual try-on  │
│ session.                            │
│ 340                                 │
└─────────────────────────────────────┘
```

FIGURE 3

METHODS, SYSTEMS, AND NON-TRANSITORY MACHINE-READABLE MEDIUM FOR INCORPORATING A SERIES OF IMAGES RESIDENT ON A USER DEVICE INTO AN EXISTING WEB BROWSER SESSION

FIELD OF INVENTION

The present invention relates to incorporating a series of images resident on a user device into an existing Web browser session.

BACKGROUND

Web-based systems that allow a user at a computer to select an article of clothing and/or an accessory and virtually "try it on" rely on the ability of the user to provide images or a digital movie of the user so that a 2D or 3D model of the user can be used as a platform for showing the user how the article of clothing and/or accessory will look on the user. However, not all computer systems include digital cameras that can allow a user to capture and provide such images or a movie. Even for computers that have an associated digital camera, the computer may be located in an area that is not conducive to capturing good quality images or movies. Hence, the resulting user experience during the virtual try-on session may be less than satisfactory.

SUMMARY

The present invention addresses these issues by providing, in one embodiment, methods and systems for providing a media object (e.g., one or more digital images, a digital audio/video file, a digital video file, etc.) from a first user device (e.g., a smart phone, tablet computer, etc.) to a remote server in context with a session that exists between the remote server and a second user device (e.g., a personal computer), or, more particularly, in context with a session that exists between an application running on the remote server and an application running on the second user device (e.g., a Web browser). In an alternative embodiment, methods and systems for providing a media object from a user device to the remote server in context with a session that exists between the remote server and that same user device, e.g., a separate application running on the user device, are provided.

BRIEF DESCRIPTION OF THE DRAWINGS

The present application is illustrated by way of example, and not limitation, in the figures of the accompanying drawings, in which:

FIG. 3 is a flow chart depicting an exemplary process, in accordance with some embodiments of the present invention.

Throughout the drawings, the same reference numerals and characters, unless otherwise stated, are used to denote like features, elements, components, or portions of the illustrated embodiments.

DESCRIPTION

Figure 1:
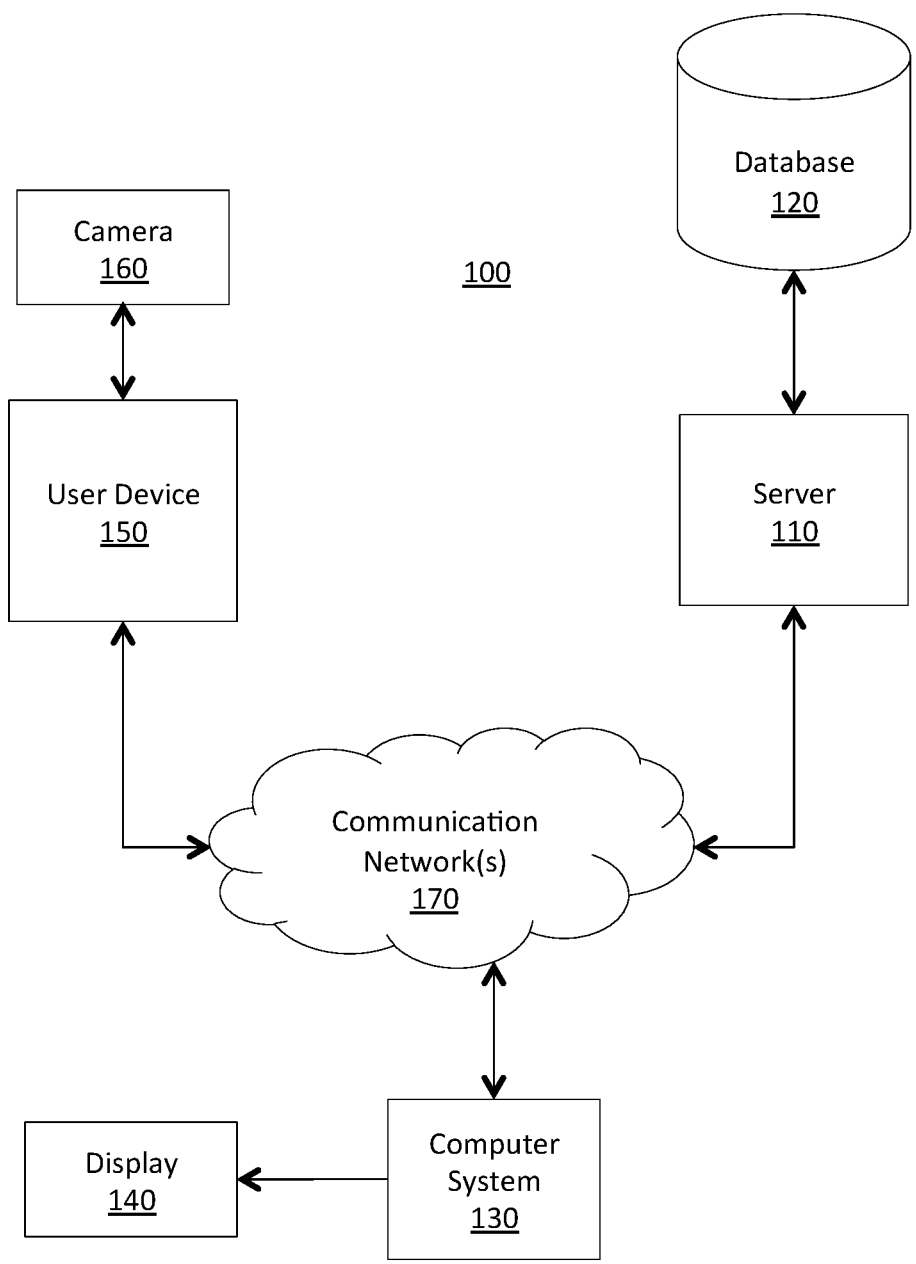
FIG. 1 is a block diagram illustrating an exemplary system, in accordance with some embodiments of the present invention.

Described herein are methods and systems for providing a media object (e.g., one or more digital images, a digital audio/video file, a digital video file, etc.) from a user device (e.g., a smart phone, tablet computer, etc.) to a remote server in context with a session that exists between a remote server and a second user device (e.g., a personal computer), or, more particularly, in context with a session that exists between an application running on the remote server and an application running on the second user device (e.g., a Web browser). By "in context", we mean that the media object is identifiable so that it can be used during an existing session between the application running on the remote server and the application running on the second user device, or at some later time by a user associated with that session. We refer to the provision of the media object from one user device to the server for use during a session that exists between the application running on the remote server and the application running on the second user device as an "out-of-band" provision of the media object.

Although the present invention finds application in a variety of use cases, it will be described with particular reference to a use case involving Web-based systems that allow a user at a computer to virtually select a pair of glasses and try the selected glasses on a model of the user's face to see how they look. Such systems permit various views of the model of the user's face with the glasses on, allowing a more complete view of the arrangement than is possible using only 2D images of the user. Typically, to create the model of the user's face, the user establishes a session with an application running on a provider's server (e.g., by visiting a web site through which the provider makes the modeling facilities available) and, using a webcam or other imaging device associated with the user's computer, takes a series of images or a short movie of the user's face from multiple different perspectives. The images or movie, as applicable, is transferred to the provider's server where it is used to construct a model of the user's face, a projection of which model is then made available to the user to virtually "try-on" different pairs of glasses. Depending on processing load, available resources, etc., the model may be created in a few seconds or minutes, although in some cases it may take longer for the model to be available for the user. Usually, the model is associated with a user account maintained by the provider and is thereby available for later use by the user during subsequent visits to the provider's website.

The user's experience with the virtual try on feature of the provider's website will, in large measure, depend on the quality of the model of the user's face that is created. In turn, the quality of the model will, in large measure, depend on the quality of the images or movies captured by the user's imaging device. Therefore, both the user and the provider have a strong interest in ensuring that the quality of the images or movie of the user's face is as high as possible.

Images or movies that are captured with a computer-bound webcam may suffer from a variety of defects. For example, when a user is seated in front of his or her computer (i.e., the display thereof) it is usually the case that the user's face is not strongly or intentionally lit. Hence, images or movies of the user's face captured with a display-mounted or -integrated webcam may be dark or may include shadows and, thus, may not provide good subjects for the creation of models. Even if models can be created from those images or movies, when the user's face is superimposed on the model the shadows or overall darkness of the image may preclude useful viewing of the model and face when virtual glasses are fitted thereon. Also, in some cases, a display-mounted or -integrated webcam may have poor resolution and so any model created therefrom may not show the user's features in sufficient detail to be useful for the user in terms of making eyeglass-purchasing decisions. Of course, other drawbacks with the use of display-mounted or -integrated webcam may also be present.

Many, if not most, computer users have mobile phones or other devices that include high-resolution digital cameras. The present invention enables users to execute the methods described herein using software native to these devices without the need to download a separate software application. Using software native to the user device saves time and device resources (e.g., power, processing, and storage) and avoids compatibility issues that may arise when, for example, the downloaded software is incompatible with the native software of the device and/or camera.

The high-resolution digital cameras included in the devices are capable of capturing high-resolution digital images and/or movies and, because the devices on which they are integrated are highly portable, they can be used in conditions very different from those in which display-mounted or -integrated webcams may be used. For example, if a user wishes to capture a high resolution digital image of his or her face in an area where his or her face is well lit and not in shadows, the user can easily transport his or her mobile phone (with camera) to that location and capture the images and/or movie. However, in some instances, a problem may arise when establishing a web session using a mobile phone or other device having a small display for the purpose of virtually trying on eyeglasses or the like because a user would not be provided a very large rendition of the model "wearing" the glasses due to the small size of the display, thus resulting in an unsatisfying experience for the user.

The present invention addresses these issues by facilitating the use of a computer system having a display that is sized such that it provides a viewing area for a user to comfortably view a rendition of the model "wearing" the glasses while still permitting the use of a mobile device (e.g., a smart phone or the like) having a camera capable of capturing high-resolution digital images and/or movies. By allowing the use of a computer system with a reasonably large sized display (which may be an integral display such as in the case of a laptop computer or a separate display as in the case of a desktop computer), a user is assured of being provided a rendition of the model "wearing" the glasses that is sized so that the user can easily view the model and use it to make selections of eyeglass frames and the like. By allowing the use of a mobile device with its high-resolution digital camera, the user is afforded the opportunity to capture images or movies under conditions conducive to having those images be well lit and otherwise suitable for use in creating the model. These two aspects of the invention are met by facilitating out-of-band delivery of the images or movie captured using the camera of the mobile device and having those images or movie associated with an existing session established between the user's computer system and the remote server at which the virtual try-on service is hosted (and/or an account with such a service associated with the user). The details of such a system and method will now be described.

Referring now to FIG. 1, a block diagram of a system 100, including elements thereof, configured to perform one or more methodologies described herein is depicted. It should be recognized that system 100 is not necessarily intended to represent the only possible configuration of components through which the methods of the present invention may be practiced. Rather, it is intended as a simplified rendition of such systems for purposes of simplifying the explanation of the present invention. Network components, such as routers, switches, telephone network equipment and the like, which are not critical to the present invention but are nevertheless necessary to an operational implementation thereof are not shown in the figure and are not discussed herein so as not to unnecessarily complicate this description.

System 100 includes a server 110 which hosts the service that allows a user to upload a media object depicting the user's face, virtually try-on eyeglasses or other articles, and view the result. The virtual try-on feature is facilitated, in one embodiment, by the server using the media object to create a model of the user's head and face. The server also stores (or has access to) a library of models for eyeglass frames (and/or other articles of clothing or accessories), which models can be overlaid on the model of the user's head and face. The resulting object is then projected to a two-dimensional image for presentation to the user in a screen of a user interface. In one example, the model of the user's head and face is created from digital images or a movie of the user's face and head taken from several perspectives (e.g., a movie that captures a rotation of the user's head and face from facing straight ahead to facing approximately 90 degrees to the left, back to straight ahead, then to approximately 90 degrees to the right, and back to straight ahead). Scale information may be provided if the images or movie include or are supplemented to include an image of an object of an approximate known size (e.g., a credit card sized object) placed at a location approximately corresponding to the user's forehead or other location. Server 110 is communicably coupled to a database 120, which stores the user images/movies and models (including, in some cases, the models of the eyeglasses or other articles of clothing or accessories). For example, the images/movies and models may be stored such that they are organized in user accounts, accessible by respective users upon authentication of the user's identity (e.g., using a user name and password combination or other authentication means). Server 110 may be a single server or a combination of servers (e.g., a server farm behind one or more load balancers). Although not shown in detail, the functions of server 110 may be distributed across multiple servers, with a dedicated web server acting as a front end to an application server and database 120 communicably coupled to the application server.

System 100 also includes a user computer system 130, with a display 140. The display 140 may be integral to the computer system 130 (e.g., as might be the case for a laptop computer) or it may be a separate component communicably coupled to computer system 130. Generally, computer system 130 will be a processor-based unit of the kind described in greater detail below. For purposes of the present invention it is sufficient if computer system 130 is configured to run a web browser that can establish a session with an application running on server 110, which application provides for the virtual try-on service described above.

System 100 also includes user device 150. User device 150 may be any device that includes (or can be adapted to include) a digital camera 160. Examples of user devices 150 include mobile communication devices (e.g., mobile telephones and smart phones) as well as tablets, and other mobile computing devices. For purposes of the present invention it is preferred, though not necessarily required, that user device 150 be sufficiently portable that a user can transport it to an area conducive to capturing images or a movie of the user's face and head that is well lit. This will allow for creation of a model of the user's head and face that will provide a pleasing user experience once it is projected into an image during a virtual try-on session. Camera 160 is preferably, though not necessarily, a high-resolution digital camera, e.g., capable of capturing images of at least 4 MB or more.

The components of system 100 may be communicatively coupled to one another via one or more communication networks 170. Although illustrated as a single entity in the illustration, network 170 may be a network of networks, such as the Internet. In many cases, network 170 will include one or more telecommunications networks, such as mobile phone networks, which may or may not use the Internet protocol. Such details are not critical to the present invention and although communication paths between server 110 and computer system 130 and server 110 and user device 150 are illustrated here as using a common network 170, this need not necessarily be true. In many, if not most, instances, portions of the networks through which communications between server 110 and computer system 130 and server 110 and user device 150 pass will involve common components as well as separate components. In some instances, they may be few, even no, such common components. For purposes of the present invention it is sufficient that communication paths between server 110 and computer system 130 and server 110 and user device 150 exist.

Preferably, though not necessarily, user device 150 is configured with a software application (an "app") that facilitates communication with applications running on server 110 and allows for the delivery of images or movies captured by camera 160. The app may be a dedicated app that communicates with the application running on server 110 though a proprietary application programming interface or, preferably, is an app that facilitates the composing and sending of electronic mail ("email") messages that include the images or movie captured by camera 160. For the remainder of this discussion delivery by email will be assumed although the use of a proprietary app to deliver the images or movie is also contemplated. Of course, the use of a proprietary app requires that the app have access to the images or movie captured by the camera.

Continuing to refer to FIG. 1 and now also referring to FIG. 3, which depicts a process 300 for providing a media object from a user device to a remote server in context with a session that exists between a remote server and a second user device (e.g., a session that exists between an application running on the remote server and an application running on the second user device). Initially, a session is established between computer system 130 and server 110 (305). More specifically, a user at computer system 130 may launch a web browser on the computer and navigate to a web site hosted by server 110. For purposes of the present example, assume that the web site is one that allows a user at computer system 130 to virtually select a pair of glasses and virtually try-on the selected glasses to see how they look. Of course, other similar kinds of virtual try-on facilities may be provided, including those that allow a user to virtually try on other articles of clothing, jewelry, etc. Common to such websites is the need for the user to provide one or more digital images or a digital movie (hereinafter a "media object") of him- or herself so that the model can be created. The session that is established will typically be via a web browser but in some instances may be via another application running on computer system 130.

During the session, before the user can virtually try-on any glasses, the user must provide the media object so that the model can be created. Assume that computer system 130 does not have a digital camera that can capture the media object or that the computer system is not located in an area conducive to capturing a media object of good quality. In accordance with the present invention, the user can request an email address (or other identifier for an out-of-band communication path, such as phone number to which to send a multimedia text message) to which to send a media object (310). In response, server 110 (i.e., the application running on the server) returns a custom email address (or other identifier for an out-of-band communication path) for use by the user (315). The custom email address may be one that is generated specifically in response to the request and may include a unique identifier that will allow the server (i.e., an application running thereon) to associate the media object transmitted to that email address with the current session between computer system 130 and server 110. For example, the email address may include a unique session identifier or other information that allows for such an association.

The email address may be presented to the user via the web browser running on computer system 130 and/or may be provided in the form of an email message sent to the user at a specified user email address. In the case of other out-of-band communication path identifiers, such identifiers may be presented to the user via the web browser running on computer system 130 and/or may be provided to the user in other forms, for example, via email, SMS message or other means.

Assuming that the user is provided a custom email address, the user is now able to capture a media object using a digital camera of the user's choice. For example, the user may use the digital camera associated with the user's mobile phone to capture the media object. Instructions for how to perform this capture may be provided to the user via the session between the computer system 130 and server 110 and/or may be provided with the custom email address transmitted to the user via email. Generally, the media object will be a short digital movie that includes views of the user's head and face from various perspectives. One benefit of being able to use a mobile device with a digital camera to perform this capture is that the user can move to a well lit area so that the resulting movie or set of still images are well lit—helping assure a good quality projected image of the user's head and face during the virtual try-on session will result. Once the user has captured the media object, the user emails the media object as an attachment to the email address provided by server 110 (320).

Upon receipt of the email with the media object attachment, server 110 extracts the media object attachment and uses it to create a model of the user's head and face (325). Using the information included in the email address at which the email with the media object attachment was received, the server associates the newly created model with the session that exists between computer 130 and server 110 (330). In addition, the model may be stored to a user account associated with the user participating in this session. Alternatively, the association with the current session may be made immediately upon receipt of the email message including the media object and the media object (as well as the later-created model) may be stored to the user's account. Regardless of the sequence, the model created from the media object received via the out-of-band channel from the user will be associated with the user's current session involving computer system 130, and a representation of the model is then made available to that session (335). In this way, the user is able to continue the virtual try-on session (340).

The representation of the model that is provided to the user is one that is preferably useful for a virtual fitting of an article on the item (e.g., the user's head and face) depicted in the media object. For example, the representation of the model may be a three-dimensional representation of the item depicted in the media object (the three-dimensional representation will be projected to two dimensions when rendered on a display) or a two-dimensional representation of the item depicted in the media object. A three-dimensional representation may be either a rigid or non-rigid three-dimensional representation of an object. Such a representation may, generally, be described by a collection of points or meshes in a three-dimensional space, which points or meshes can be fixed in that three-dimensional space (e.g. eye corners), or may move around therein (e.g. mouth corners when a person smiles in some frames). Two-dimensional representations may include features that can be detected without a three-dimensional representation. For example, to detect and track an eye corner, one does not need to know where this eye corner is in a three-dimensional space. One can detect an eye corner in a two-dimensional frame, and then follow it on other frames using either a feature descriptor (data that describes what the eye corner looks like on a video, for example), or an optical flow (which describes how pixels move in a video without knowledge that the pixels correspond to an eye corner, for example). Alternatively, or in addition, the representation of the model useful for a virtual fitting of an article on the item depicted in the media object may include features and descriptors of the item depicted in the media object, said features and descriptors being detected through analysis of the media object.

Of course, the present invention finds application in contexts other than that described immediately above. For example, in some cases the user may be visiting the web site hosted at server 110 using a mobile device and a web browser running on the mobile device. In most instances, the digital camera of a mobile device is not directly accessible from the web browser running on that device. Hence, a process similar to that discussed above, in which the user is provided a custom email address to transmit a media object to, may be used. In such a case, once the custom email address is requested, the user may exit the browser application, launch the digital camera, capture the media object and send it by email or other communication means to the designated email address or other communication address, then revert to the web browser application and either establish a new session or continue the previous session. The server will receive the email with the media object, extract the media object and use it to create a model, associate that model with the user and/or the session with the user's mobile device (based on the unique identifier information included in the email address), and ultimately provide the projection of the model to the user as part of that session or a new session. In the case where a new session is established, the model will be available to the user upon successful authentication for purposes of accessing a user account.

Many variants of the above-described process exist. Common among these variants, however, will be the use of a unique session identifier, such as a session ID, IP address associated with a computer system, etc., that identifies the user's interaction with the server for a virtual try-on session. Also, the use of a custom or semi-custom email address or other communication address designated as a receiving point for the media object provided by the user. The server will maintain a mapping (e.g., a table or other map) between the session identifier and the communication address so that media objects received at the server can be properly associated with user sessions/accounts. On some occasions, the communication address may be generated using user identification credentials or other information received from the user. Such credentials may be associated with a previously instantiated user account.

Figure 2:
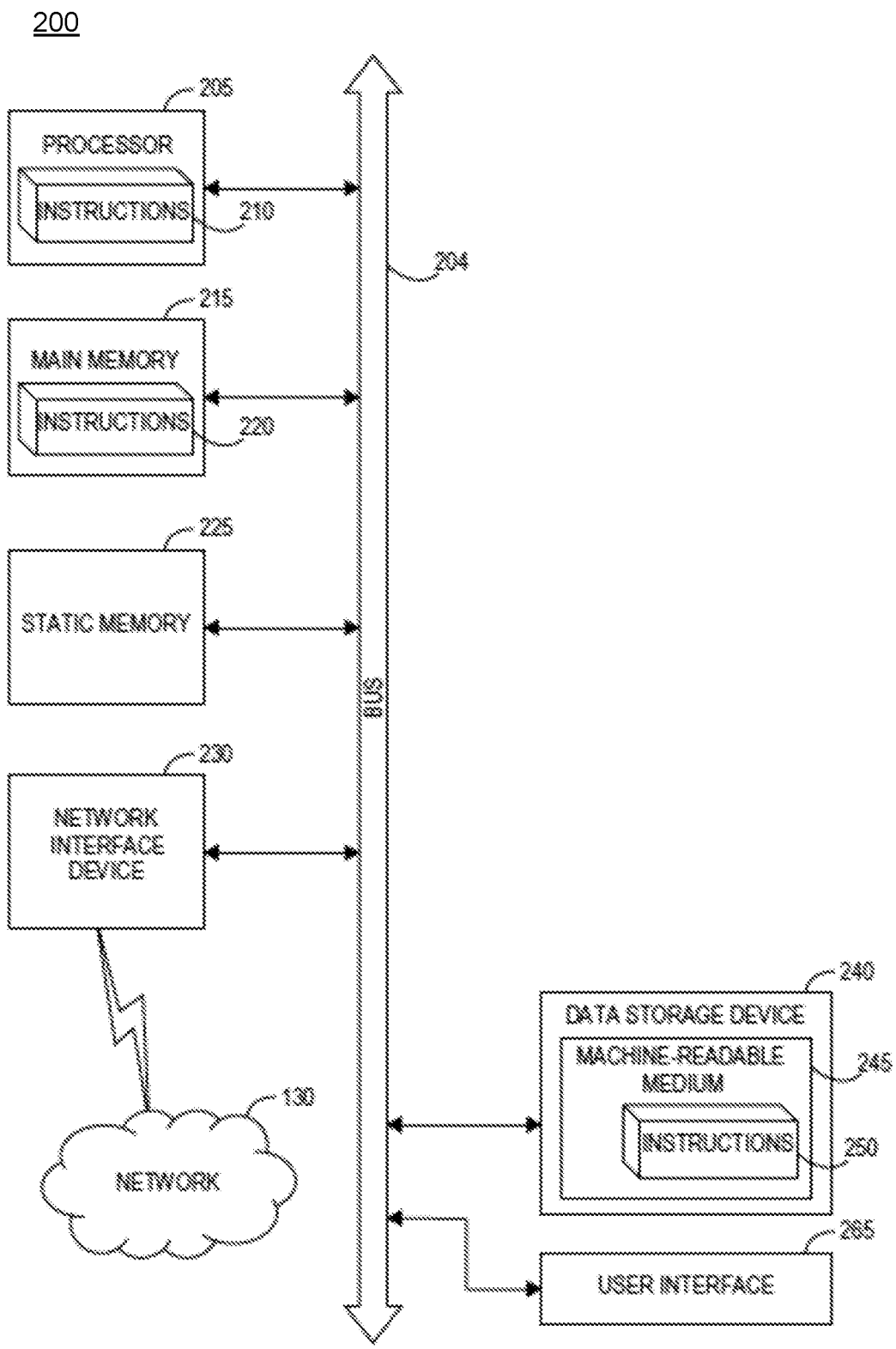
FIG. 2 is a block diagram illustrating an exemplary Web server, in accordance with some embodiments of the present invention.

FIG. 2 is a block diagram illustrating one example of a processor-based device 200, which in various implementations may be any of computer system 130, server 110 or user device 150. Device 200 is configured by instructions 210, 220, and 250 to perform any one or more of the methodologies discussed herein. In this example, components of device 200 are coupled directly, or indirectly, to a communication bus 204, although in other cases layers of busses or, indeed, different busses or other communication paths may be used to communicatively couple the various components of the device. Therefore, it should be appreciated that the example shown in FIG. 2 is intended only as one possible computer system configuration and is not intended to limit the scope of the present invention in any way.

Device 200 includes a network interface device 230 coupled to bus 204. Network interface device 230 provides a two-way data communication path between device 200 and communication network 130. Device 200 can send messages and receive data, sets of instructions, and/or content elements from components of system 100 via communication network 130 through network interface device 230. A user of device 200 may interact with the device via user interface 265. Exemplary user interfaces 265 include a keyboard, touch screen, one or more buttons, a speaker, and a microphone.

Device 200 also includes a processor 205 (e.g., a central processing unit (CPU), a graphics processing unit (GPU), or both), a main memory 215 (e.g., which may be in the form of dynamic random access memory (DRAM), etc.), and a static memory 225 (e.g., flash memory, read only memory (ROM), etc.), which communicate with each other and with processor 205 via a bus 204.

Device 200 may further include a data storage device 240 for storing, personal information about a user, and/or user account information. Data storage device 240 may include a non-transitory machine-readable storage medium 245 on which is stored one or more sets of instructions 250 (e.g., software) embodying any one or more of the methodologies or functions described herein. Set of instructions 250, as well as user account information, may also reside, completely or partially, within main memory 215 and/or within processor 205 during execution of various operations by device 200. In some embodiments, static memory 225 and processor 205 may also constitute non-transitory machine-readable storage media (at least in part). While instructions 250 are shown in this illustration to be on a single medium, the term "non-transitory machine-readable storage medium" should be taken to include a single medium or multiple media (e.g., a centralized or distributed database or data source and/or associated caches and servers) that store the one or more sets of instructions 250. The term "non-transitory machine-readable storage medium" shall also be taken to include any non-transitory medium that is capable of storing, encoding, or carrying a set of instructions for execution by device 200 and that cause device 200 to perform any one or more of the methodologies of the present invention. The term "non-transitory machine-readable storage medium" shall accordingly be taken to include, but not be limited to, solid-state memories, optical media, and magnetic media.

Thus, methods and systems for providing a media object (e.g., one or more digital images, a digital audio/video file, a digital video file, etc.) from a user device (e.g., a smart phone, tablet computer, etc.) to a remote server in context with a session that exists between a remote server and a second user device (e.g., a personal computer), or, more particularly, in context with a session that exists between an application running on the remote server and an application running on the second user device (e.g., a Web browser) have been described. While the subject invention was described with reference to particular illustrated examples, these examples were not intended as limiting and changes and modifications can be made to the described embodiments without departing from the true scope and spirit of the subject invention as defined by the appended claims.

What is claimed is:

1. A method, comprising:
   during a session that is established over a first communication channel between a first processor-based device and a server, and in response to a request from a user received from the first communication channel, the request requesting a communication path identifier for transmitting a media object to the server, the server providing the communication path identifier for provision of the media object to be associated with the session, the communication path identifier (i) including information that allows for association of the media object with the session and (ii) being associated with a second communication channel between a second processor-based device and the server, the second communication channel being separate from the first communication channel which is used for the session;
   in response to receiving the media object from the second processor-based device in a communication via the second communication channel, the server extracting the media object from the communication, creating, using the media object, a model of an item depicted in the media object, and associating the model with the session using information included in the communication path identifier; and
   providing, by the server, a representation of the model for a virtual fitting of an article on the item depicted in the media object, said representation being provided during the session for manipulation by the user via the first processor-based device.

2. The method of claim 1, wherein the representation of the model comprises a three-dimensional representation of the item depicted in the media object.

3. The method of claim 1, wherein the representation of the model comprises a two-dimensional representation of the item depicted in the media object.

4. The method of claim 1, wherein the representation of the model comprises features and descriptors of the item depicted in the media object, said features and descriptors being detected through an analysis of the media object.

5. The method of claim 1, wherein the representation of the model comprises an optical flow of information concerning the item depicted in the media object.

6. The method of claim 1, wherein the media object comprises a digital movie or one or more digital images depicting a human face.

7. The method of claim 6, wherein the communication path identifier comprises an email address.

8. The method of claim 1, wherein the communication comprises an email message, and the media object is included as an attachment to the email message.

9. The method of claim 8, wherein the media object comprises a digital movie or one or more digital images depicting a human face.

10. The method of claim 1, wherein the communication path identifier is provided to the first processor-based device.

11. The method of claim 10, wherein the second processor-based device comprises a mobile phone with a digital camera.

12. A server comprising a processor and a storage device communicatively coupled to the processor, the storage device storing processor-executable instructions that, when executed by the processor, cause the processor to:
    during a session that is established over a first communication channel between a first processor-based device and the server, and in response to a request from a user received from the first communication channel, the request requesting a communication path identifier for transmitting a media object to the server, provide the communication path identifier for provision of the media object to be associated with the session, the communication path identifier (i) including information that allows for association of the media object with the session and (ii) being associated with a second communication channel between a second processor-based device and the server, the second communication channel being separate from the first communication channel which is used for the session;
    in response to receiving the media object from the second processor-based device in a communication via the second communication channel, extract the media object from the communication, create, using the media object, a model of an object depicted in the media object, and associate the model with the session using information included in the communication path identifier; and
    provide a projection of the model during the session, said projection being provided during the session for manipulation by the user via the first processor-based device.

13. The server of claim 12, wherein the media object comprises a digital movie or one or more digital images depicting a human face.

14. The server of claim 13, wherein the communication path identifier comprises an email address.

15. The server of claim 12, wherein the communication comprises an email message, and the media object is included as an attachment to the email message.

16. The server of claim 15, wherein the media object comprises a digital movie or one or more digital images depicting a human face.

17. The server of claim 16, wherein the communication path identifier is included in an email which is sent to an email address of the user.

18. The server of claim 12, wherein the communication path identifier comprises an email address.

* * * * *